United States Patent [19]

Lawhon et al.

[11] 4,316,733

[45] Feb. 23, 1982

[54] APPARATUS AND METHOD FOR ATTENUATING GLASS RIBBON

[75] Inventors: Robert A. Lawhon, Carlisle; Jeffrey S. Yigdall, Conneaut Lake, both of Pa.

[73] Assignee: PPG Industries, Inc., Pittsburgh, Pa.

[21] Appl. No.: 191,041

[22] Filed: Sep. 25, 1980

[51] Int. Cl.³ ............................................. C03B 18/06
[52] U.S. Cl. ................................. 65/99 A; 65/182.4
[58] Field of Search ................ 65/182.1, 182.3, 182.4, 65/182.5, 346, 99 A

[56] References Cited

U.S. PATENT DOCUMENTS 3,520,672  7/1970  Greanler et al. ........................ 65/91
3,661,548  5/1972  Ito et al. ............................ 65/182 R
3,713,797  1/1973  Lawrenson ............................. 65/91
3,929,444  12/1975  May et al. ........................ 65/182 R
4,157,908  6/1979  Gagne ................................ 65/99 A Primary Examiner—Arthur D. Kellogg
Attorney, Agent, or Firm—Lee Patch; Donald C. Lepiane

[57] ABSTRACT

An edge roll apparatus for engaging the marginal edge portion of a hot ribbon of glass, including a body portion and circumferentially positioned teeth. The teeth are shaped to establish at least a 90° angle between the surface of the glass and the leading and outwardly directed edges of the teeth during at least one half of a tooth's engagement path to improve gripping ability.

10 Claims, 5 Drawing Figures

APPARATUS AND METHOD FOR ATTENUATING GLASS RIBBON

FIELD OF THE INVENTION

This invention relates to an improved method of attenuating a ribbon of glass being formed by a float process and to an improved edge roll apparatus for engaging the marginal edge portion of a ribbon of glass.

DISCUSSION OF THE TECHNICAL PROBLEM

In the flat glass manufacturing art a ribbon of hot glass floats downstream through a chamber across a pool of molten metal while longitudinal forces are exerted thereto to produce attenuation. The marginal edge portions of such a ribbon are typically engaged with a plurality of opposed pairs of edge rolls to exert longitudinal and lateral forces thereto to control the ribbon width and thickness. Such edge rolls typically consist of a rotatably mounted body portion having a plurality of teeth radially oriented about the periphery, each of the teeth being symmetrically shaped in generally pyramidal form. To exert both longitudinal and lateral forces, the edge rolls are generally rotated about an axis of rotation which is angled downstream toward the discharge end of the chamber. While useful in controlling ribbon width and thickness, such edge rolls also have limitations associated with their use.

As can be appreciated, the hot glass tends to resist the accelerative force applied by the edge roll teeth in the longitudinal direction. Furthermore, internal forces in the glass continuously tend to narrow the glass ribbon during longitudinal stretching, thus actively resisting the outwardly directed lateral forces applied by the edge roll teeth. Because edge roll teeth are typically symmetrically shaped pyramids having a square cross-section, the hot glass is engaged by teeth faces all of which are sloped so as to form acute angles with the surface of the hot glass for at least one half of their engagement path. During such an acute angle of engagement, the tooth faces impart a downwardly directed component of force on elements of the ribbon. Thus, the working faces of the teeth, i.e. the leading and outwardly directed faces (142 and 146 of FIGS. 4 and 5), engage the resisting glass surface in a manner which promotes slippage of the glass along their sloped surfaces during at least one half of their engagement with the ribbon. If less than optimum gripping is accomplished, the teeth must be more deeply engaged into the glass surface than is desirable. Further, a greater downstream angle for the axis of rotation may be required to produce the desired lateral force, and more edge rolls may be required along the edge of the ribbon to produce the desired width and thickness control.

U.S. Pat. No. 3,661,548 to Ito et al. shows in FIG. 17a an edge roll having spline-like teeth with outwardly directed faces which are normal to the axis of rotation of the edge roll and leading faces which nearly lie along axial lines through the edge roll. Although useful in gripping a hot glass surface, such teeth still permit more than a desired amount of slippage along their working faces, particularly along the leading face which appears to contact the glass with an acute angle for more than one half of its engagement path. It would be advantageous therefore to have an edge roll with improved glass gripping ability.

SUMMARY OF THE INVENTION

The present invention provides an edge roll with improved glass gripping ability, including a body portion which is rotatable about an axis of rotation and which supports a plurality of glass engaging members, e.g. teeth, about its circumferential surface. Each of the teeth has a leading edge, and selected teeth are shaped such that an axial line which passes through the intersection point of the leading edge and body portion is either parallel to the leading edge or passes through the tooth. Each of the teeth of the present invention may also have a outwardly directed edge, with selected teeth shaped such that a plane normal to the axis of rotation which passes through the intersection point of the outwardly directed edge and the body portion passes through the tooth. The teeth of the present invention may be positioned in two rows about the circumferential surface of the body portion, with each of the rows normal to the axis of rotation. The teeth may be shaped in any convenient manner, it being preferred to employ teeth which are pyramid shaped having tetragonal cross-sections.

The invention also relates to an improved method of attenuating a hot glass ribbon, including mounting a plurality of glass engaging members, e.g. teeth, on the circumferential surface of a body portion of an edge roll, and rotatably engaging the marginal edge portion of the ribbon with the teeth. The improvement includes engaging selected teeth such that the leading edge of each of the selected teeth forms an angle equal to or greater than 90° with the surface of the ribbon during at least one half of its engagement therewith. Selected teeth may also be engaged such that the outwardly directed edge forms an obtuse angle with the surface of the ribbon during at least a portion of its engagement therewith.

The present invention provides an improved edge roll having superior glass gripping ability by establishing an angle between the leading edge of the edge roll teeth and the surface of the glass which is at least a right angle during at least one half of its engagement. Further, an angle may be established between the outwardly directed edge of the teeth and the surface of the glass which is greater than 90°. Such angles of engagement tend to diminish glass slippage along the working edges by minimizing the undesirable downwardly directed component of force which is exerted in the initial portion of the engagement path and by maximizing an upwardly directed component of force which is exerted during the latter portion of the engagement path. This improves the gripping ability of the teeth and permits the use of less depth of teeth engagement, less downstream angle for the axis of rotation, and potentially fewer edge rolls in operation.

DESCRIPTION OF THE INVENTION

Figure 1:
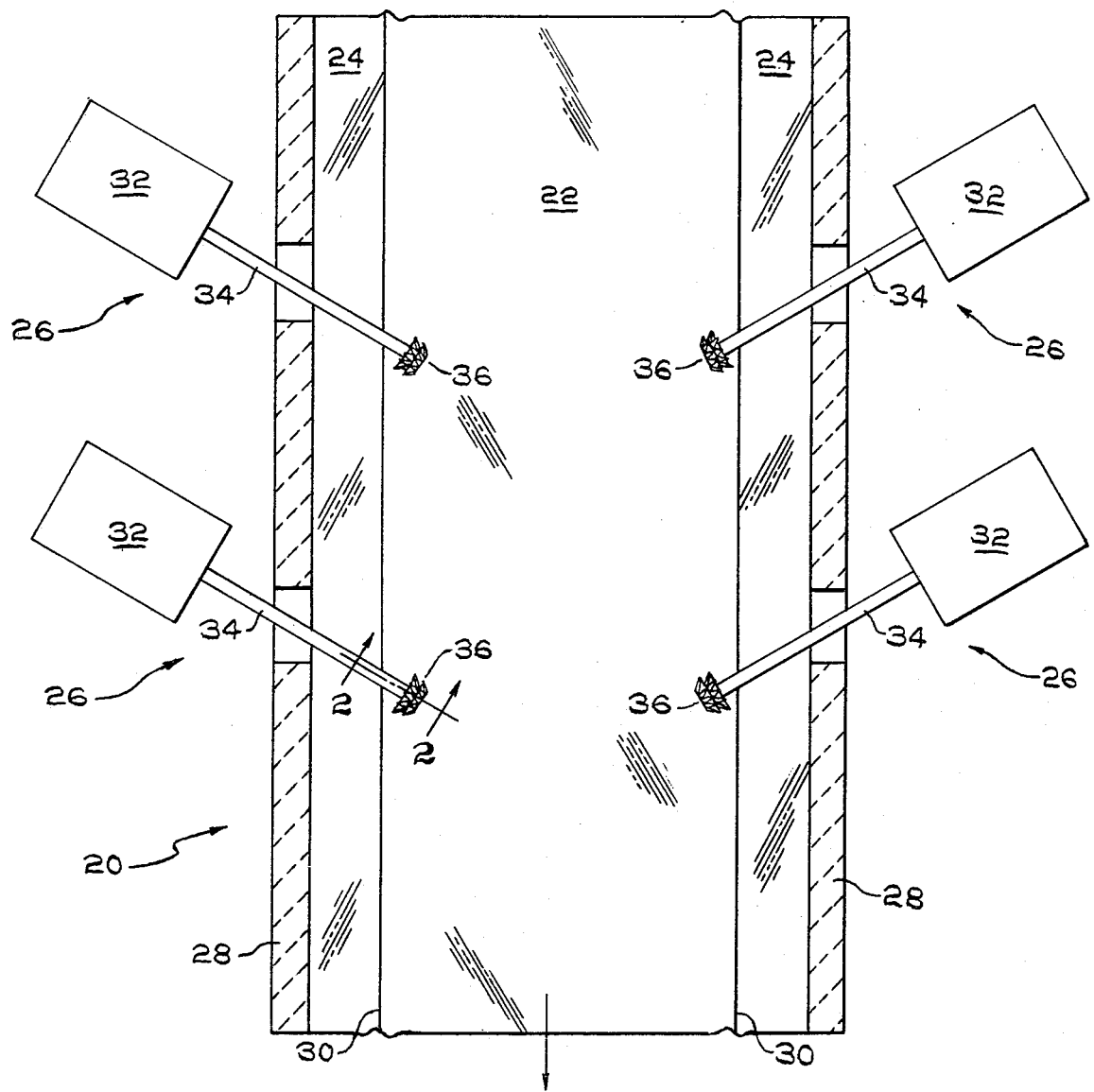
FIG. 1 is a plan view of a float chamber with portions removed for purposes of clarity showing edge rolls incorporating features of the present invention.

With reference to FIG. 1, there is shown the interior of a float chamber 20 of the type known in the glass manufacturing art. A ribbon 22 of hot glass is supported therein upon a pool 24 of molten metal, e.g. tin, and is conveyed downstream thereacross in the direction of the arrow by lift out rolls (not shown) positioned adjacent the output end. A plurality of opposed pairs of edge roll machines 26 extend into the chamber 20 through openings in the chamber sidewalls 28 to engage the marginal edge portions 30 of the ribbon 22 and exert attenuating forces thereto. The edge roll machines 26 generally include an exterior support facility 32, an elongated barrel 34, and an edge roll head 36 which rotatably engages the ribbon 22. Barrels 34 typically extend into the chamber 22 in a slight downstream direction to enable the edge roll heads 36 to exert longitudinal forces to accelerate the ribbon downstream and lateral forces to resist the ribbon's internal forces which tend to decrease the ribbon width. The invention may be practiced with top edge rolls described herein, with bottom edge rolls as taught in U.S. Pat. No. 3,533,772, or with any other ribbon engaging device known in the glass manufacturing art.

Figure 4:
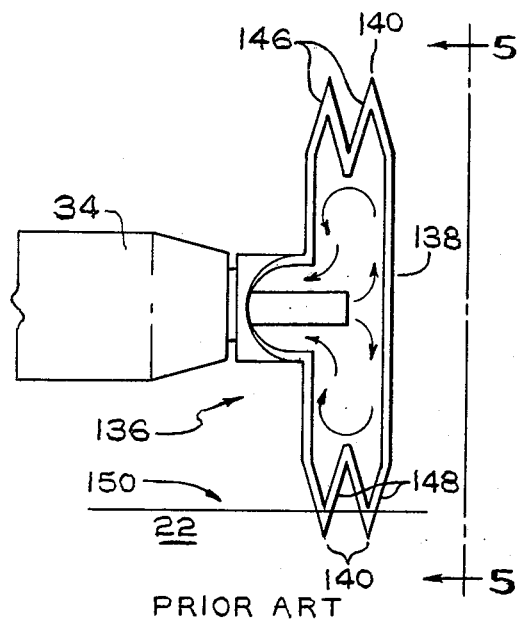
FIG. 4 is a sectional side view similar to FIG. 2 of a prior art edge roll apparatus included to facilitate an understanding of the present invention.
Figure 5:
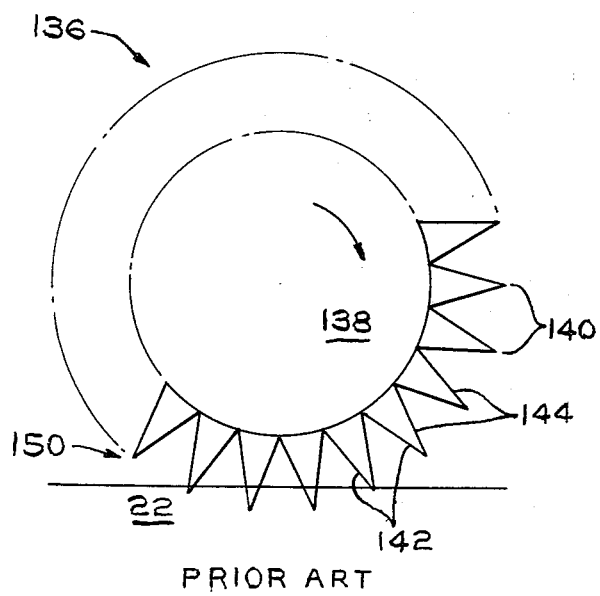
FIG. 5 is a view similar to FIG. 3 taken along line 5—5 of FIG. 4.

Referring to FIGS. 4 and 5, a brief description of the prior art will be included in this specification to facilitate an understanding of the present invention. A prior art edge roll head 136 is shown to be rotatably mounted on the end of barrel 34. The edge roll head 136 includes a body portion 138 having two rows of radially aligned teeth 140 secured to the circumferential surface. As shown in FIGS. 4 and 5, the teeth 140 are typically pyramid shaped with square cross-section, formed of four faces which will be referred to herein as the leading face 142, the trailing face 144, the outwardly directed face 146, and the inwardly directed face 148. The leading face 142 is defined as facing in the direction of rotation of the body portion 138; the trailing face 144 thus facing opposite the direction of rotation. The outwardly directed face 146 is defined as the face adjacent the barrel 34, the inwardly directed face adjacent the longitudinal centerline of the ribbon 22. As can be appreciated by a study of the engagement area 150 of FIG. 4, during engagement with the ribbon 22 each of the faces 146 and 148 will form an acute angle with the surface of ribbon 22. Hereinafter the leading face 142 and the outwardly directed face 146 will be collectively referred to as the working faces, because when the body portion 138 is rotated in a clock-wise direction as viewed in FIG. 5, the leading face 142 will be actively gripping the ribbon 22 to exert longitudinal forces thereto while the outwardly directed face 146 acts to resist the ribbon's narrowing tendencies. Of course, the angle between the leading face 142 and the ribbon surface will vary as the tooth 140 rotates through its engagement path from its initial ribbon engagement point to its ribbon release point. During the engagement path the leading face 142 will form an acute angle with the surface of the ribbon at its initial ribbon engagement point, after which the angle of engagement will increase as the tooth rotates through its arcuate path. Nevertheless an acute angle will be formed therebetween for more than one half of the engagement path. An acute angle of engagement between the faces 142 and 146 and the ribbon produces a downwardly directed component of force upon contacted elements of the ribbon which promotes slippage of the hot glass along the working faces to limit the gripping ability of the teeth 140 of the prior art edge roll head 136.

Figure 2:
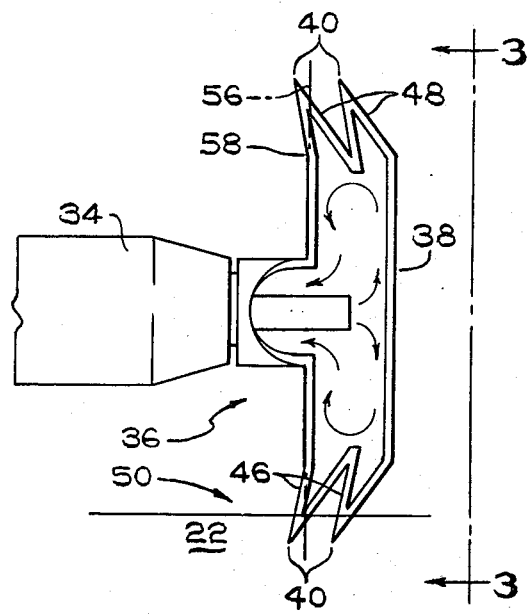
FIG. 2 is a sectional side view taken along line 2—2 of FIG. 1 of an edge roll apparatus incorporating features of the present invention.
Figure 3:
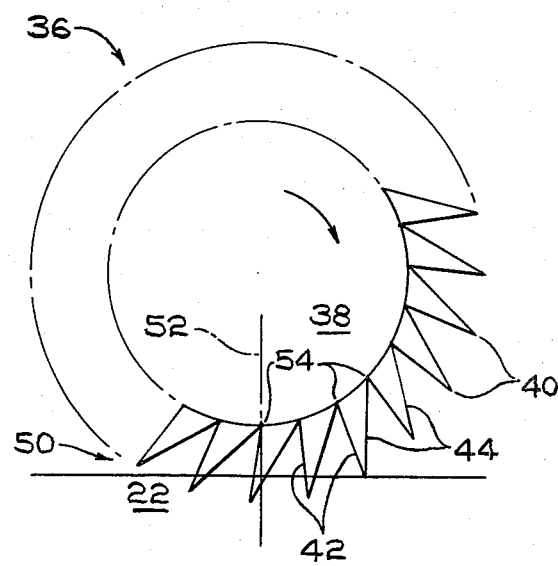
FIG. 3 is a view taken along line 3—3 of FIG. 2.

Referring now to FIGS. 2 and 3, an edge roll head 36 incorporating features of the present invention is shown rotatably mounted to one end of the barrel 34. In a preferred embodiment of the invention the edge roll head 36 includes a plurality of pyramid shaped teeth 40 positioned in two rows about the circumferential surface of a body portion 38, each of the rows normal to the barrel 34. The teeth 40 are formed of four faces, hereinafter referred to as the leading face 42, the trailing face 44, the outwardly directed face 46, and the inwardly directed face 48, as defined hereinbefore.

As can be appreciated from studying engagement area 50 of FIGS. 2 and 3, the working faces, i.e. leading face 42 and outwardly directed face 46, of the teeth 40 contact the ribbon 22 at least at right angles, and preferably at an obtuse angle for at least one half of their engagement path. More particularly and with reference to FIG. 3, an axial line 52 which passes through the point 54 defined by the intersection of the leading face 42 and the body portion 38 is parallel to the leading face 42, or passes through the subject tooth 40. In this manner, slippage of the hot glass along the leading face 42 is diminished by minimizing the downwardly directed component of force exerted by the leading face 42 during the initial portions of the engagement path and by maximizing an upwardly directed component of force exerted during the latter portion of the engagement path. The leading face 42 of the preferred teeth 40, as shown in FIG. 3, will exert an upwardly directed component of force upon the ribbon during at least the latter one half of its engagement path, thus retaining elements of glass in surface contact therewith to improve the gripping ability of the edge roll head 36.

Referring now to FIG. 2, according to the preferred embodiment of the invention, a plane 56 normal to the axis of rotation passing through the point 58 defined by the intersection of the outwardly directed face 46 and the body portion 38 passes through the subject tooth 40. In this manner an upwardly directed component of force is exerted by the outwardly directed face 46 to minimize slippage of the hot glass along the outwardly directed face 46, thus further improving the gripping ability of the edge roll head 36.

As can be appreciated, the present invention is not limited to a pyramid shaped glass engaging tooth, as conical, cylindrical, or any other convenient shape may be utilized in keeping with the practice of the present invention. Accordingly, the invention is intended to be limited only by the claims which follow.

We claim:

1. In an edge roll for rotatably engaging a ribbon of glass to exert attenuating forces to the marginal edge portions thereof, including a body portion supporting a plurality of glass engaging members about its circumferential surface, each of said glass engaging members having glass penetrating end portions, a leading edge and a first intersection point defined by the intersection of the leading edge and the body portion, the improvement comprising:

first selected ones of said glass engaging members fixed and shaped relative to said body portion at least during engagement between each of said glass engaging members and said ribbon of glass such that an axial line which passes through the first intersection point is parallel to the leading edge or passes through the glass engaging member.

2. In an edge roll for rotatably engaging a ribbon of glass to exert attenuating forces to the marginal edge portions thereof, including a body portion supporting a plurality of glass engaging members about its circumferential surface, each of said glass engaging members having glass penetrating end portions, an outwardly directed edge and a second intersection point defined by the intersection of the outwardly directed edge and the body portion, the improvement comprising:

second selected ones of said glass engaging members shaped such that a plane normal to the axis of rotation passing through the second intersection point passes through the glass engaging members.

3. The apparatus as set forth in claim 1 wherein second selected ones of said glass engaging members have an outwardly directed edge and a second intersection point defined by the intersection of the outwardly directed edge and the body portion, and wherein said second selected ones of said glass engaging members are shaped such that a plane normal to the axis of rotation passing through the second intersection point is parallel to the outwardly directed edge or passes through the glass engaging member.

4. The apparatus as set forth in claim 3 wherein said first selected ones of said glass engaging members includes each of said glass engaging members, and wherein said second selected ones of said glass engaging members includes each of said glass engaging members.

5. The apparatus as set forth in claim 4 wherein said glass engaging members are generally pyramid shaped having tetragonal cross-sections.

6. In a method of attenuating a ribbon of glass comprising the steps of mounting a plurality of glass engaging members having glass penetrating end portions on the circumferential surface of a body portion of an edge roll, rotating the body portion about an axis of rotation, and engaging a marginal edge portion of the ribbon of glass with said edge roll such that each of said glass engaging members engages said ribbon during a portion of its movement path defined as an engagement path; the improvement comprising:

engaging the ribbon of glass with first selected ones of said glass engaging members such that the leading edge of each of said first selected ones of said glass engaging members forms an angle equal to or greater than 90° with the surface of said ribbon during at least one half of its engagement path.

7. In a method of attenuating a ribbon of glass comprising the steps of mounting a plurality of glass engaging members having glass penetrating end portions on the circumferential surface of a body portion of an edge roll, rotating the body portion about an axis of rotation, and engaging a marginal edge portion of the ribbon of glass with said edge roll such that each of said glass engaging members engages said ribbon during a portion of its movement path defined as an engagement path; the improvement comprising:

engaging the ribbon of glass with second selected ones of said glass engaging members such that the outwardly directed edge of the second selected ones of said glass engaging members forms an obtuse angle with the surface of said ribbon during at least a portion of its engagement path.

8. The method as set forth in claim 6 further comprising the step of:

engaging the ribbon of glass with second selected ones of the glass members such that the outwardly directed edge of the second selected ones of said glass engaging members forms an obtuse angle with the surface of said ribbon during at least a portion of its engagement path.

9. The method as set forth in claim 8 wherein said first selected ones of said glass engaging members includes all of said glass engaging members.

10. The method as set forth in claim 9 wherein said second selected ones of said glass engaging member includes all of said glass engaging members.

* * * * *